Figures 1, 2:
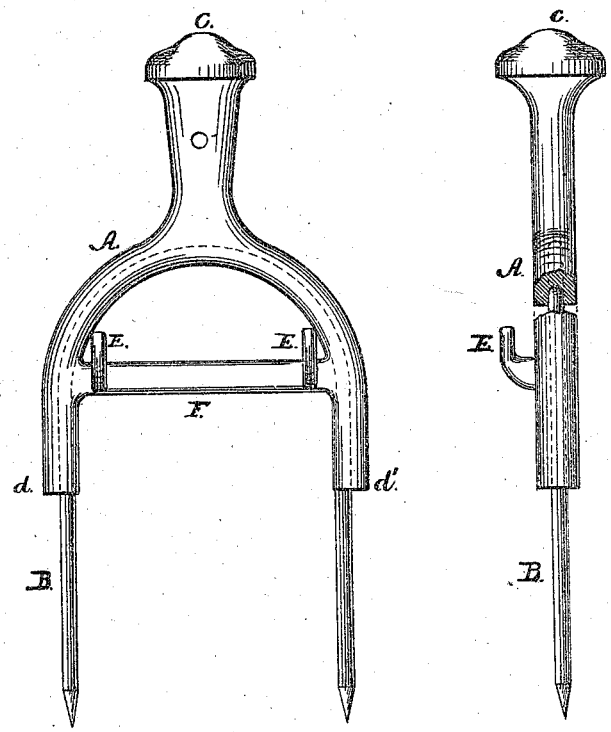

E. A. BARKER.
Croquet Wicket-Drivers.

No. 142,072.  Patented August 26, 1873.

WITNESSES  
Walter B. Vincent  
Nathaniel R. Morgan

INVENTOR:  
Edwin A. Barker

UNITED STATES PATENT OFFICE.

EDWIN A. BARKER, OF PROVIDENCE, RHODE ISLAND.

IMPROVEMENT IN CROQUET-WICKET DRIVERS.

Specification forming part of Letters Patent No. 142,072, dated August 26, 1873; application filed May 14, 1873.

*To all whom it may concern:*

Be it known that I, EDWIN A. BARKER, of the city and county of Providence, in the State of Rhode Island, have invented a certain new and useful Wicket-Driver and Gage; and I do hereby declare that the following specification, taken in connection with the drawing making a part of the same, is a full, clear, and exact description thereof.

Figure 1 is a view of the wicket and driver in elevation. Fig. 2 is a side view of the same.

The object of my invention is to produce a driver with which wickets, commonly used in the game of croquet, may be easily, quickly, and without damage, driven into the ground to a uniform distance; and consists in the device for that purpose hereinafter described.

It is well known that in driving the wickets into the ground with the mallets generally used in connection with the game, or provided for that purpose, they are very often seriously damaged, and not unfrequently so bent out of shape as to be almost unfit for further use.

In my invention I make use of a driver, A, placed over the wicket B, as shown in Figs. 1 and 2, which may be constructed of malleable iron, or other material if desired. The driver A is made upon a curve corresponding with the upper curved portion of the wicket, and has, upon the inside, a groove, into which the said wicket is received.

When it is desired to set the wicket into the ground, the driver is placed upon it, as shown in Figs. 1 and 2, and forces the wicket down, by means of blows upon the head C of the driver, until the lower ends $d\,d$ of the said driver rest upon the ground, when the latter is removed and the wicket is ready for use.

With the help of the driver the wickets may be driven into the ground without injuring their shape, and at the same time will all be of a uniform height.

When it is necessary to remove the wickets from the ground, the hooks $e\,e$ upon the cross-piece F may be placed under the same, and the wicket easily drawn out by the aid of any convenient lever.

What I claim as my invention, and desire to secure by Letters Patent, is—

1. A croquet-wicket driver, constructed substantially in the manner described, for the purpose specified.

2. In combination with a croquet-wicket driver, the prolonged legs to operate as a gage, substantially as described.

3. A wicket-driver provided with the hooks E for withdrawing the wicket, substantially as described.

EDWIN A. BARKER.

Witnesses:
 NATHANIEL L. MORGAN,
 WALTER B. VINCENT.